May 8, 1956 F. KOCKS 2,744,820
METHOD FOR THE PRODUCTION OF IRON AND STEEL
Filed Dec. 2, 1952
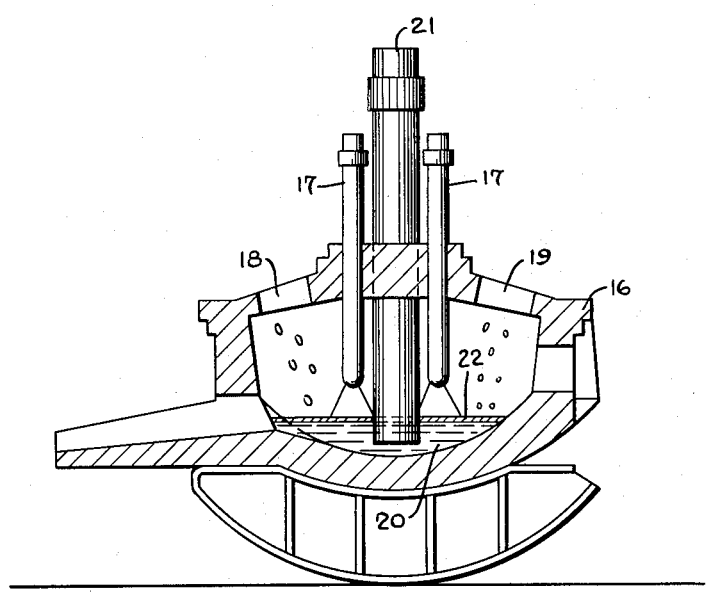
INVENTOR:
FREDERICH KOCKS,
BY
HIS AGENTS.

United States Patent Office 2,744,820
Patented May 8, 1956

2,744,820
METHOD FOR THE PRODUCTION OF IRON AND STEEL

Friedrich Kocks, Dusseldorf, Germany

Application December 2, 1952, Serial No. 323,555

Claims priority, application Germany December 8, 1951

4 Claims. (Cl. 75—11)

The invention relates to the direct production of steel from iron ores and the like iron containing materials. The process being the subject matter of this invention is based on the known experience that iron ores charged onto the surface of a carbon rich iron melt are reduced faster and more effectively by the carbon of this melt than by solid carbon mixed with the ore or charged with the same.

The known methods of reducing iron ores by the carbon containing metals have not found an introduction into practical work because the reduction of the ores ceases as soon as the carbon contents of the melt is reduced to a certain value and because the art has hitherto not succeeded to satisfactorily replace the used-up carbon of the melt in a simple and reliable manner and at the rate which this replacement requires.

In order to effect a continuous iron production by reduction of the iron ore with liquified carbon and particularly carbon rich molten iron a customary electrode furnace may be used; the carbon may be charged into the iron bath through one or more carbon electrodes, which reach into the latter. At the rate the ore to be reduced is entered into the furnace through one or several openings of the furnace cover or the furnace walls the carbon contents of the bath will be consumed. The carbon required for the reduction is in conformity with the invention continuously supplied into the bath from the electrodes reaching into the latter, the electrodes being lowered into the bath in accordance with their consumption. The bath may be easily controlled to a carbon percentage which guarantees a most economical production. In this manner the process can be continuously performed in a very simple manner.

The invention will now be described more in detail and with reference to the attached drawing showing a vertical furnace used for the performance of the invention.

This furnace 16 is provided with the electrodes 17 creating the required processing heat.

Whereas the ore is introduced through aperture 18 and the flux through aperture 19 provided in the ceiling of the furnace at a rate which enables the reduction of the ore and the solution of the reduced metal in the carbon rich iron melt 20, an adjustable massive carbon rod or electrode 21, which reaches into the iron bath supplies the carbon required for the reduction. If the entering rate of the electrode 21 into the bath 20 and the supply of ore and flux is adjusted in accordance with the teachings of the invention, an extremely efficient, simple, continuous process results for the reduction of the iron ore.

The introduction of the carbon by means of the adjustable coal electrode 21 into the bath is more economical and effective as the supply of the reduction coal onto the surface of the bath, where the coal must penetrate the molten surface slag layer 22, even if the same may be thin.

If the invention is used for the performance of a continuous process, whereby the metal is periodically tapped, not only crude iron but also steels having a predetermined percentage of carbon may be produced. This object is easily attained by the removal of the coal supplying electrode 21 from the melt 20 prior to the tapping of the furnace and without an interruption of the electric supply. When the iron has been reduced by the ore to a desired carbon percentage, a steel may be tapped upon a short interruption of the ore supply and lifting of the electrode 21, while a certain amount of iron is retained in the furnace. Hereupon the electrode 21 is again entered into the bath and a short time later the supply of ore and fluxes is commenced. As far as its continuity is considered this process is similar to a blast furnace process.

For the purpose of the discontinuous steel production the carbon contents of the molten carbon rich containing metal bath is reduced by the fresh charge until the desired carbon contents of the steel is reached. In this case the admixture of coal may eventually be entirely omitted or the coal may be added for a desired time in conformity with the desired reduction to iron. Whereupon the carbon content of the bath is reduced by further supply of ore to the desired percentage of carbon.

A particular advantage of this process, independently upon its continuous or discontinuous performance, consists therein that the reduction of the ore is independent upon the physical or chemical quality of the carbon. Any type of carbon materials, for instance, also waste carbon may be used for the manufacture of the electrodes 21.

Since in melting with electrical energy the consumption of coal only represents a portion of the coal required in customary metallurgical processes the quality of the carbonizing media used in conformity with the invention is immaterial.

The invention may, of course, be carried-out not only in electric arc furnaces and any other high-frequency heated furnace is usable for its purposes.

As above described the direct production of carbon poor iron and of steel may be effected without an interruption of the process or the reduction of iron ore.

With this purpose in view, the electrode 21, the figure, serving to carbonize the metal bath is removed from the same; the supply of ore is, however, not interrupted. This supply is continued until the metal bath is enriched to the desired percentage of carbon. Thereupon the bath is tapped while retaining a certain quantity of the molten iron in the furnace. The carbon electrode is now again entered into the bath and the same is regenerated to the carbon contents which is required for a renewed reduction. It is apparent that with the continuous procedure for the reduction of iron ore according to the invention steels of a varying carbon contents as well as crude iron may be produced in a simple manner and without a constructional change of the furnace.

Based upon the teaching of this invention the ore to be reduced may be supplied into a carbon containing iron melt gradually at a rate at which the bath is capable to dissolve the same, whereby steel and low carbon iron may be also discontinuously produced. In this case the carbon contents of the molten iron is used-up by reduction of the ores entirely or to a desired degree and thereupon the charge is tapped. Hereafter carbon containing crude iron is either charged in the molten state or its is produced in the furnace from solid pig iron and is then treated as before described.

Example

A quantity of 3 per cent C containing Fe to produce a melt which will about cover the bottom of the furnace shown in the figure is charged into the latter and molten. The temperature maintained in the furnace lies at about 50 degrees above the melting temperature of the iron.

The iron ore to be reduced is entered onto the melt 20 through opening 18 and the flux through the opening 19.

Carbon is introduced into the melt by means of the vertically displaceable electrode 21.

The supply of the ore, of the fluxes and of the carbon is so controlled that the formation of a solid layer is substantially prevented on the melt 20; the reduction of the ore to iron therefore takes place at the rate of the supply of the charge upon the surface of the melt 20.

Since certain changes in carrying out the above process could be made without departing from the scope thereof, it is intended that all matter contained in the above description or shown in the accompanying drawing shall be interpreted as illustrative and not in a limiting sense.

What I claim is:

1. In a method for the production of iron and steel from iron ores in an electrically heated furnace the steps of gradually supplying the iron ore and the flux onto the surface of an iron melt maintained in said furnace in a molten state and at the contents of 1 to about 4.5 per cent carbon, reducing the iron ore continuously by the carbon of the iron melt, continuously replacing the carbon contents of the iron melt by means of a vertically adjustable carbon rod reaching into said iron melt and tapping the reduced iron and the formed slag from the furnace.

2. In a method for the production of iron and steel from iron ores in an electrode operated furnace the steps of gradually supplying the iron ore and the flux onto the surface of an electrically heated iron melt maintained in said furnace at a molten state and at the contents of 1 to about 4.5 per cent carbon, reducing the iron continuously by the carbon of the iron melt, continuously replacing the carbon contents of the iron melt by means of a vertically adjustable carbon rod reaching into said iron melt and periodically tapping the reduced iron and the formed slag from the furnace.

3. In a method for the production of iron and steel from iron ores in an electrode operated furnace the steps of gradually supplying the iron ore and the flux onto the surface of an electrically heated iron melt maintained in said furnace at a molten state and at the contents of 1 to about 4.5 per cent carbon, reducing the iron continuously by the carbon of the iron melt, continuously replacing the carbon contents of the iron melt by means of a vertically adjustable carbon rod reaching into said iron melt and continuously tapping the reduced iron and the formed slag from the furnace.

4. In a method for the production of iron and steel from iron ores in an electrode operated furnace the steps of gradually supplying the iron ore and the flux onto the surface of an electrically heated iron melt maintained in said furnace in a molten state and at the contents of 1 to about 4.5 per cent carbon, reducing the iron ore continuously by the carbon of the iron melt, continuously replacing the carbon contents of the iron melt by means of a vertically adjustable carbon rod reaching into said melt, tapping the reduced iron and lifting said vertically adjustable carbon rod prior to said tapping at such a timely rate from the melt that the latter is reduced to the desired carbon contents by additionally supplied ore and thereupon tapping the iron while maintaining a molten sump of a sufficient height to enable the reentrance of the carbon rod after completion of the tapping.

References Cited in the file of this patent

UNITED STATES PATENTS

| | | |
|---|---|---|
| 1,459,187 | Pratt | June 19, 1923 |
| 1,888,312 | Dudley et al. | Nov. 22, 1932 |